US007362868B2

(12) United States Patent
Madoukh et al.

(10) Patent No.: US 7,362,868 B2
(45) Date of Patent: Apr. 22, 2008

(54) HIDDEN LINK DYNAMIC KEY MANAGER FOR USE IN COMPUTER SYSTEMS WITH DATABASE STRUCTURE FOR STORAGE OF ENCRYPTED DATA AND METHOD FOR STORAGE AND RETRIEVAL OF ENCRYPTED DATA

(75) Inventors: Ashraf Madoukh, Overland Park, KS (US); Ognjen Vasic, Lenexa, KS (US); Suhail Ansari, Lenexa, KS (US); Bassam Khulusi, Overland Park, KS (US); Jinhui Hu, Lenexa, KS (US)

(73) Assignee: Eruces, Inc., Lenexa, KS (US)

( * ) Notice: Subject to any disclaimer, the term of this patent is extended or adjusted under 35 U.S.C. 154(b) by 1254 days.

(21) Appl. No.: 09/693,605

(22) Filed: Oct. 20, 2000

(65) Prior Publication Data

US 2001/0019614 A1 Sep. 6, 2001

(51) Int. Cl.
*H04L 9/00* (2006.01)
(52) U.S. Cl. .................... 380/277; 713/165
(58) Field of Classification Search ................ 380/270, 380/30, 277; 705/54, 56; 709/225, 229; 713/165, 176
See application file for complete search history.

(56) References Cited

U.S. PATENT DOCUMENTS 4,423,287 A 12/1983 Zeidler (Continued)

FOREIGN PATENT DOCUMENTS

EP 0 884 670 A1 12/1998

(Continued)

OTHER PUBLICATIONS

Churches, Tim; "A proposed architecture and method of operation for improving the protection of privacy and confidentiality in disease registers"; BMC Medical Research Methodology, Biomed Central, London, GB, vol. 3, No. 1; Jan. 6, 2003, pp. 1-13.

*Primary Examiner*—Ayaz Sheikh
*Assistant Examiner*—Arezoo Sherkat
(74) *Attorney, Agent, or Firm*—Spencer Fane Britt & Browne LLP

(57) ABSTRACT

A computer system (20) having a security domain (22), at least one client business domain (26), and a plurality of client terminals (34) utilizes a hidden link dynamic key manager (24, 84) and a database structure that includes encrypted data entities (30C, 30D) and a security identification attribute (32) for storage of encrypted data. Methods for encrypting data and for storing, decrypting, and retrieving encrypted data operate on the computer system (20), which also includes an information database (62) and a key database (44). The key database (44) is isolated from the information database (62). The hidden link key manager is stored in the security domain (22) and includes a system key manager (84) operable to generate system keys with system key common names and an encryption key manager (24) operable to generate encryption keys having encryption key identifications. The key managers (24, 84) operate on a key server (40), which is mirrored by a secondary key server (42). A general security manager (82) also operates on the key server (40) to control access to the security domain (22). The security information attribute (32) is stored with a persistent data entity (30A) that is associated with the other encrypted data entities (30C, 30D) by a database schema. The encryption key identification (112) for the encryption key used to encrypt the data entities (30C, 30D) is encrypted by a system key and then stored as part of the security information attribute (32). The system key common name hash value (114) is also stored in the security information attribute (32). The information data entities (30) are stored on the information database (62), but the encryption key identification (153), encryption key (154), system key common name hash value (156, 157), and system key common name (158) are stored in the key database (44) inside the security domain (22). The system key itself is stored on a Smart Card reader (56) inside the security domain.

58 Claims, 8 Drawing Sheets

U.S. PATENT DOCUMENTS

| | | | |
|---|---|---|---|
| 4,578,530 A | | 3/1986 | Zeidler |
| 4,713,753 A | | 12/1987 | Boebert et al. |
| 4,757,534 A | * | 7/1988 | Matyas et al. ................. 705/56 |
| 4,912,762 A | | 3/1990 | Lee et al. |
| 5,301,270 A | | 4/1994 | Steinberg et al. |
| 5,319,705 A | * | 6/1994 | Halter et al. ................... 705/54 |
| 5,363,507 A | | 11/1994 | Nakayama et al. |
| 5,369,702 A | | 11/1994 | Shanton |
| 5,495,533 A | * | 2/1996 | Linehan et al. ............. 713/155 |
| 5,530,939 A | * | 6/1996 | Mansfield et al. .......... 707/201 |
| 5,533,123 A | | 7/1996 | Force et al. |
| 5,546,304 A | | 8/1996 | Marschner et al. |
| 5,604,801 A | * | 2/1997 | Dolan et al. ................. 713/159 |
| 5,625,693 A | | 4/1997 | Rohatgi et al. |
| 5,680,452 A | | 10/1997 | Shanton |
| 5,682,524 A | | 10/1997 | Freund et al. |
| 5,729,608 A | | 3/1998 | Janson et al. |
| 5,748,735 A | * | 5/1998 | Ganesan ...................... 713/165 |
| 5,757,925 A | | 5/1998 | Faybishenko |
| 5,764,772 A | * | 6/1998 | Kaufman et al. ............. 380/30 |
| 5,778,072 A | | 7/1998 | Samar |
| 5,796,830 A | | 8/1998 | Johnson et al. |
| 5,809,497 A | | 9/1998 | Freund et al. |
| 5,815,573 A | | 9/1998 | Johnson et al. |
| 5,870,468 A | * | 2/1999 | Harrison ...................... 713/165 |
| 5,881,225 A | | 3/1999 | Worth |
| 5,907,618 A | | 5/1999 | Gennaro et al. |
| 5,915,025 A | | 6/1999 | Taguchi et al. |
| 5,937,066 A | | 8/1999 | Gennaro et al. |
| 5,949,882 A | | 9/1999 | Angelo |
| 6,044,154 A | | 3/2000 | Kelly |
| 6,052,469 A | | 4/2000 | Johnson et al. |
| 6,058,188 A | | 5/2000 | Chandersekaran et al. |
| 6,084,969 A | | 7/2000 | Wright et al. |
| 6,148,342 A | * | 11/2000 | Ho ............................... 709/225 |
| 6,160,891 A | * | 12/2000 | Al-Salqan ................... 380/286 |
| 6,199,113 B1 | * | 3/2001 | Alegre et al. ................ 709/229 |
| 6,249,866 B1 | * | 6/2001 | Brundrett et al. ........... 713/165 |
| 6,289,451 B1 | | 9/2001 | Dice |
| 6,463,155 B1 | * | 10/2002 | Akiyama et al. ............ 380/278 |
| 6,640,304 B2 | * | 10/2003 | Ginter et al. ................ 713/193 |
| 6,947,556 B1 | * | 9/2005 | Matyas et al. ................. 380/29 |
| 2004/0143745 A1 | * | 7/2004 | Margolus et al. ........... 713/176 |

FOREIGN PATENT DOCUMENTS

| | | |
|---|---|---|
| EP | 11143780 | 5/1999 |
| FR | 2810434 | 12/2001 |
| WO | WO 97/49211 | 12/1997 |
| WO | WO 00/04435 | 1/2000 |
| WO | WO 01/35226 A1 | 5/2001 |
| WO | WO 02/29577 A2 | 4/2002 |

* cited by examiner

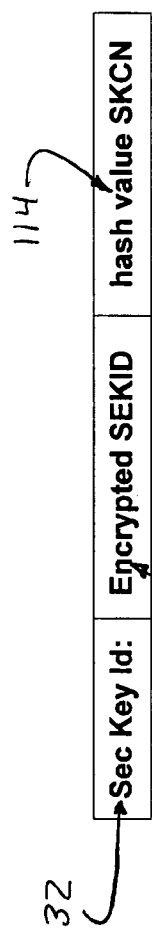
Fig. 4
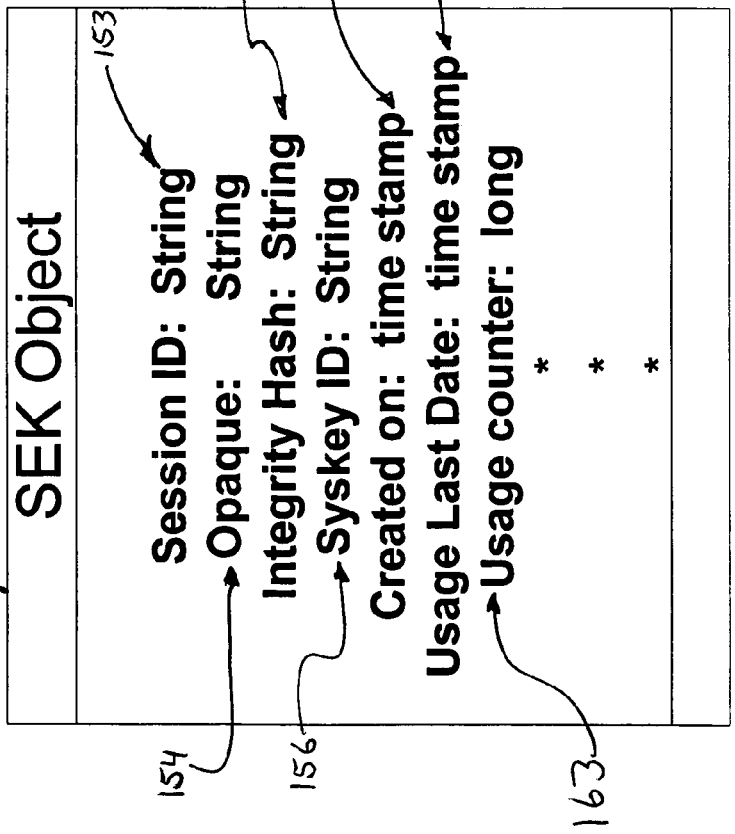
Fig. 9
Fig. 8

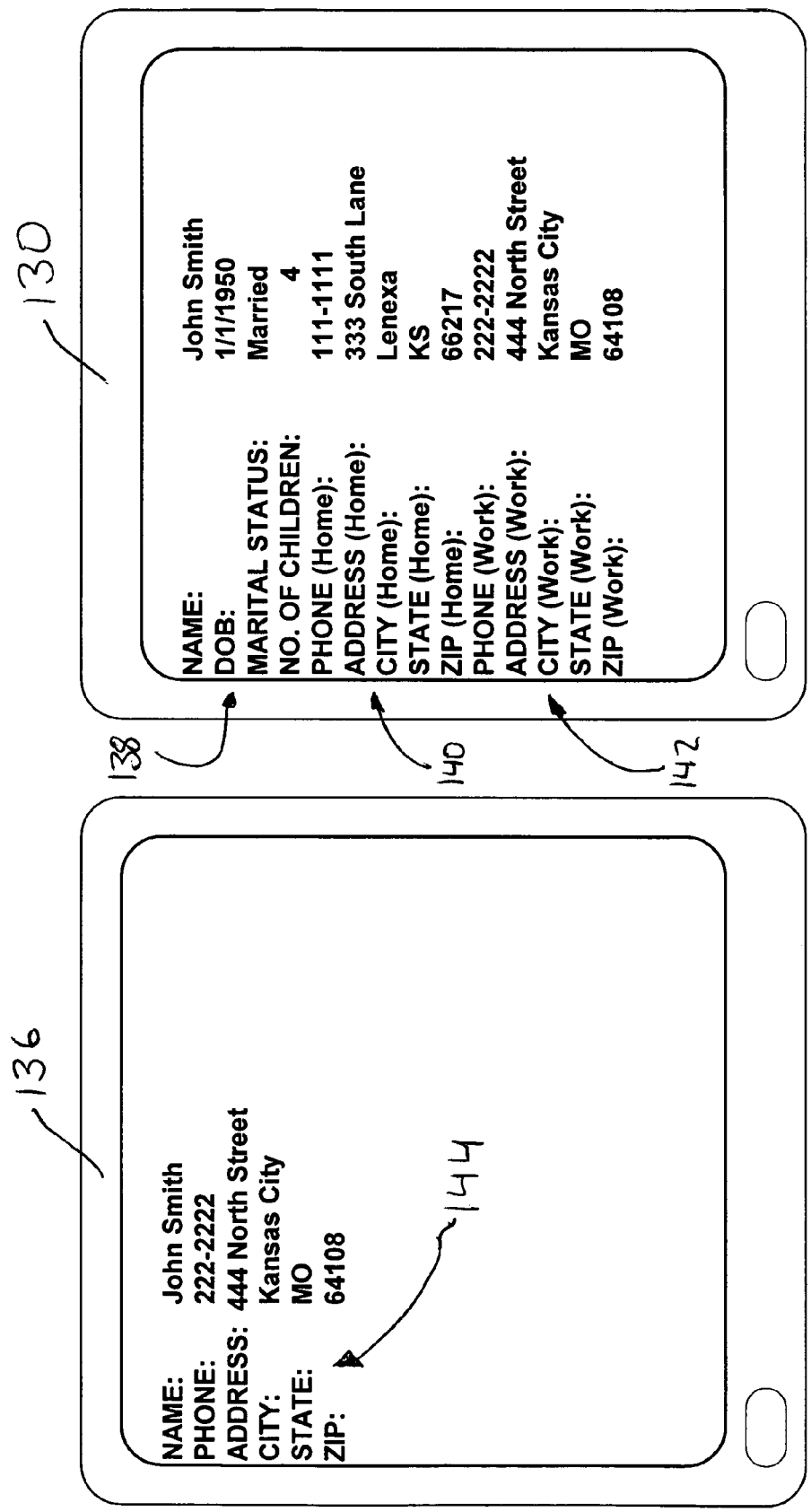

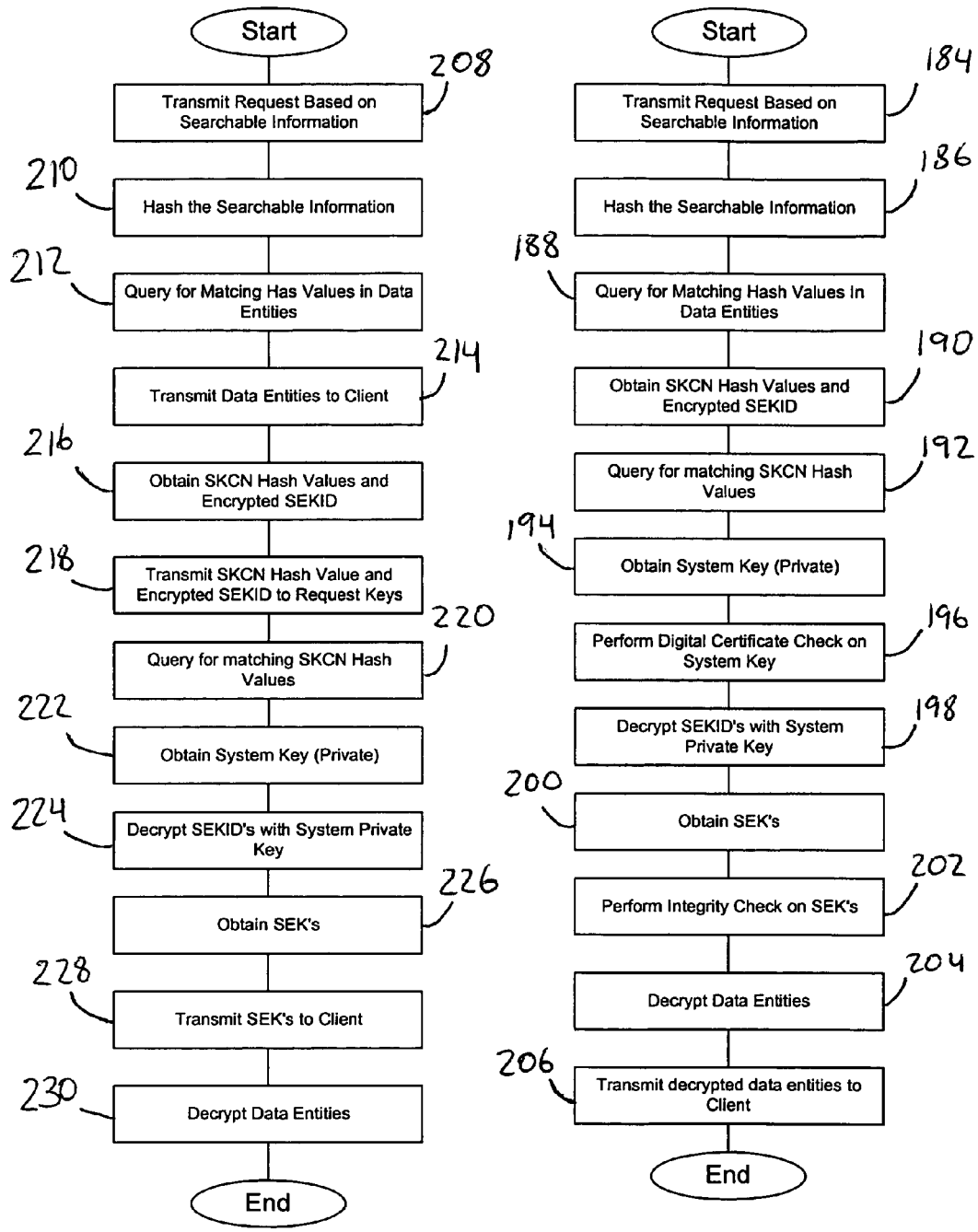

HIDDEN LINK DYNAMIC KEY MANAGER FOR USE IN COMPUTER SYSTEMS WITH DATABASE STRUCTURE FOR STORAGE OF ENCRYPTED DATA AND METHOD FOR STORAGE AND RETRIEVAL OF ENCRYPTED DATA

FIELD OF THE INVENTION

This invention relates to computer system security for data storage, transmission, and retrieval and, more particularly, to encryption methods and database structures for the storage, transmission, and retrieval of confidential information in computer systems.

BACKGROUND OF THE INVENTION

With the proliferation of the Internet and broadband networks, many Internet and e-commerce companies are dealing with the exchange of confidential information over the Internet. Examples of confidential information include credit card numbers, bank account numbers, social security numbers, birth dates, and highly personal and private medical records. Current digital certificates issued under the public key infrastructure (PKI) system use secure sockets layer (SSL) protocol to protect Internet communications in transit. Thus, many Internet companies are using firewalls and SSL as the standard means for protecting communication between their clients and their servers. While SSL protocol developed by Netscape Communications Corporation is capable of providing 128-bit length keys, the longer the key the stronger the encryption, the use of single and fixed key cryptography to encrypt such confidential information is vulnerable to current cyber attack methods. Also SSL protects data in transit only. Thus, recently publicized assaults were successful in quickly stealing thousands of credit card numbers and other confidential information from various web sites.

Typically, an e-commerce company attempts to protect its fixed encryption key and sensitive data by locating its servers in a physically secure room equipped with locked doors and surveillance cameras. However, hackers do not need physical access to server rooms in order to access data stored on a company's server. Hackers simply need legitimate Internet protocol (IP) access to the company's network. Even with the use of firewalls, this access can be gained through several hacking methods such as IP spoofing and network scanning. After a hacker gains access to the network, it simply requires some patience to obtain the fixed encryption key utilizing common cyber attacks and network scanners. Once the encryption key is obtained, hackers can decrypt most, if not all, of the information on the company's server including credit card numbers and other sensitive confidential information about the company's customers and employees.

From a medical patient's perspective, the consequences of unauthorized access to personal medical records are even greater. For a typical consumer, canceling and replacing credit cards is a relative minor inconvenience compared to the compromise and potential publication of sensitive medical information. Further, tampering with medical information is a potentially life threatening violation of privacy. Therefore, the protection of confidential information, especially medical records, requires a greater assurance that the customer's or patient's confidential information is secure.

BRIEF SUMMARY OF THE INVENTION

There is, therefore, provided in the practice of the invention a novel computer system utilizing a hidden link dynamic key manager, which provides increased security for encrypted data. The computer system broadly includes an encryption key manager operable to generate a strong encryption key having an encryption key identification. The computer system also includes an information database operable to store a data entity encrypted by the encryption key. The information database is further operable to store the encryption key identification in association with the data entity.

In a preferred embodiment, the computer system also includes a system key manager operable to generate a system key having a system key common name. The system key is used to encrypt the encryption key identification. Thus, the encryption key identification is preferably encrypted when it is stored in association with the data entity. The system key common name is also stored, preferably in hash format, on the information database in association with the data entity. The computer system also includes a key database, which is separate and isolated from the information database. The encryption key and its encryption key identification are stored in the key database. Preferably, the system key common name is hashed in the information database, and the system key common name hash value is stored with the system key common name in the key database. Alternatively, to separate the system key common name from the encryption key identification, a separate system key database can be provided for the system key common name and system key common name hash value. The system key certificate, which includes the system key itself, is preferably stored in a security token such as a smart card. Thus, the computer system is provided with a Smart Card reader. The encryption key certificate is also stored in the smart card.

The preferred computer system also includes a key lifetime manager operable to monitor encryption key expiration dates and request new encryption keys upon the expiration of old encryption keys. In one embodiment, the encryption keys are preferably dynamic and rotate with high frequency. The encryption keys change or rotate upon the occurrence of desired rotation events such as a user beginning a new task. The encryption keys are dynamic in that when an encryption key expires, the computer system will retrieve all data encrypted with the old encryption key and use a new encryption key to encrypt the data. The system key is preferably rotating but not dynamic. The encryption key manager is housed in a security domain, and the computer system utilizes a general security manager as a gatekeeper to the security domain. To enhance security, the encryption key manager is operable to communicate only with the general security manager.

In an alternate embodiment, the key lifetime manager is operable to flag the expired keys and to change or deactivate the expired keys in the next client request or call. In this embodiment, the encryption keys are dynamic in that expired keys are replaced as data is retrieved. An advantage of this embodiment is that the key lifetime manager does not control access to the information database thereby reducing the opportunities for unauthorized access to the key lifetime manager.

In another aspect of the invention, a method for storage and retrieval of encrypted data according to the present invention is implemented by the computer system of the present invention. Broadly, the method includes encrypting a data entity with an encryption key having an encryption key identification. The data entity is stored, and the encryption key identification is stored in association with the data entity.

In a preferred embodiment, a user requests data manipulation such as viewing, updating, or adding information using a searchable attribute, such as a customer's name. A search query is issued for matches of the searchable attribute. Preferably, the searchable attribute is hashed for reduced search times and increased security. After matches are located, security key information is extracted from the data entities. The security key information preferably includes the encryption key identification in an encrypted form and the system key common name hash value. The system key common name is then located using the system key common name hash value, and the system key common name is then used to retrieve the system key. Preferably, a private certificate authority verifies the system key digital certificate. The system key is then used to decrypt the encryption key identification, which is in turn used to locate the encryption key. The data entity is then decrypted with the encryption key. Because of the rotating nature of the encryption key, several encryption keys may be used to encrypt all the information associated with an individual. Additionally, because of the rotating nature of the system key, different system keys may encrypt the encryption key identifications corresponding to an individual. Because the system key is stored in the Smart Card or other security token, which is held within the security domain, the system keys never leave the security domain, and if the system key common name is hashed as preferred, the system key common name never leaves the security domain.

In still another aspect of the present invention, a computer readable medium is provided in the computer system for encrypted data at rest. The computer readable medium contains a database structure for the storage of encrypted data. The database structure includes at least one data entity encrypted by at least one encryption key and at least one encryption key identification in association with the data entity.

In a preferred embodiment, the system key is used to encrypt the encryption key identification using its public key, and the database structure further includes the system key common name hash value. Preferably the database structure includes two databases including the information database, which contains the data entity, and a key database, which contains the encryption key, encryption key identification, system key common name hash value, and system key common name. In an alternate embodiment, a system key database may be provided which stores the system key common name and system key common name hash value. As previously described, there are preferably a plurality of data entities encrypted by a plurality of encryption keys, and the encryption key identifications for the encryption keys are encrypted by multiple system keys. The database structure further includes the security token, preferably a Smart Card, which stores the system keys' digital certificates and encryption keys' digital certificates.

In a further aspect of the present invention, a computer readable data transmission medium in accordance with the present invention contains the data structure described. In a preferred embodiment the data transmission medium includes IPSEC secure channel for communication between the general security manager, in the security domain, and the information databases in the other domains.

In a still further aspect of the present invention a method of providing a secure environment for the storage of information is implemented on the computer system. The method includes encrypting a data entity with an encryption key, and storing the data entity. The encryption key identification is stored in association with the data entity. Preferably, a system key having a system key common name is used to encrypt the encryption key identification.

In another aspect of the present invention, a method is provided in the computer system for displaying customer information. Broadly, an authenticated or trusted user enters a request to view information, which is then retrieved. The computer system then checks the security status of the information, and a security access list is reviewed to find an identification corresponding to the user. The security access level of the user is checked, and the display parameters for the information are adapted to modify the available display fields based on the security access level of the user. The permitted information is then displayed.

In a preferred embodiment, adapting the display parameters comprises eliminating available display fields corresponding to information that the user is not entitled to view. The user's identification may be specific to the user's identity or to a role or security level of the user. Additionally, when a responsible user marks information as private, the responsible user is automatically added to the security special access list (SAL). The security special access list (SAL) also controls which users may edit the information and which users may only view the information.

In yet another aspect of the present invention, a method is implemented in the computer system for communicating with an encryption server. The method includes establishing a trusted communication with a general security manager of the encryption server, and entering a request for manipulation of data. A data entity is received in response to the request and security key information is retrieved from the data entity. The security key information is used to request an encryption key, and after receiving the encryption key, the data entity is decrypted.

In a preferred embodiment, retrieving the security key information comprises retrieving the encryption key identification in an encrypted form and a system key common name hash value. Again, there is typically a plurality of data entities provided in response to the request, and the security key information from the plurality of data entities includes multiple encryption key identifications and multiple system key common name hash values. Thus, multiple encryption keys are requested, and multiple encryption keys are received with which to decrypt the plurality of data entities.

Accordingly, it is an object of the present invention to provide an improved system for use in computer systems with database structure for storage of encrypted data and methods for storage and retrieval of encrypted data.

BRIEF DESCRIPTION OF THE DRAWINGS

These and other inventive features, advantages, and objects will appear from the following Detailed Description when considered in connection with the accompanying drawings in which similar reference characters denote similar elements throughout the several views and wherein:

FIG. 4 is a schematic diagram of a security key identification attribute of the database structure of FIG. 4;

FIG. 5 is a schematic diagram of a monitor illustrating adaptable display parameters according to the present invention and having only public information and fields displayed;

FIG. 6 is a schematic diagram of a monitor illustrating the adaptable display parameters according to the present invention and having both public and private information and fields displayed;

FIG. 8 is a schematic diagram of a session encryption key data entity;

FIG. 9 is a schematic diagram of a system key common name data entity;

FIG. 11 is a schematic block diagram illustrating the retrieval and decryption of data entities during update and view transactions;

FIG. 12 is a schematic block diagram illustrating an alternate embodiment for the retrieval and decryption of data entities during update and view transactions;

DETAILED DESCRIPTION

Figure 1:
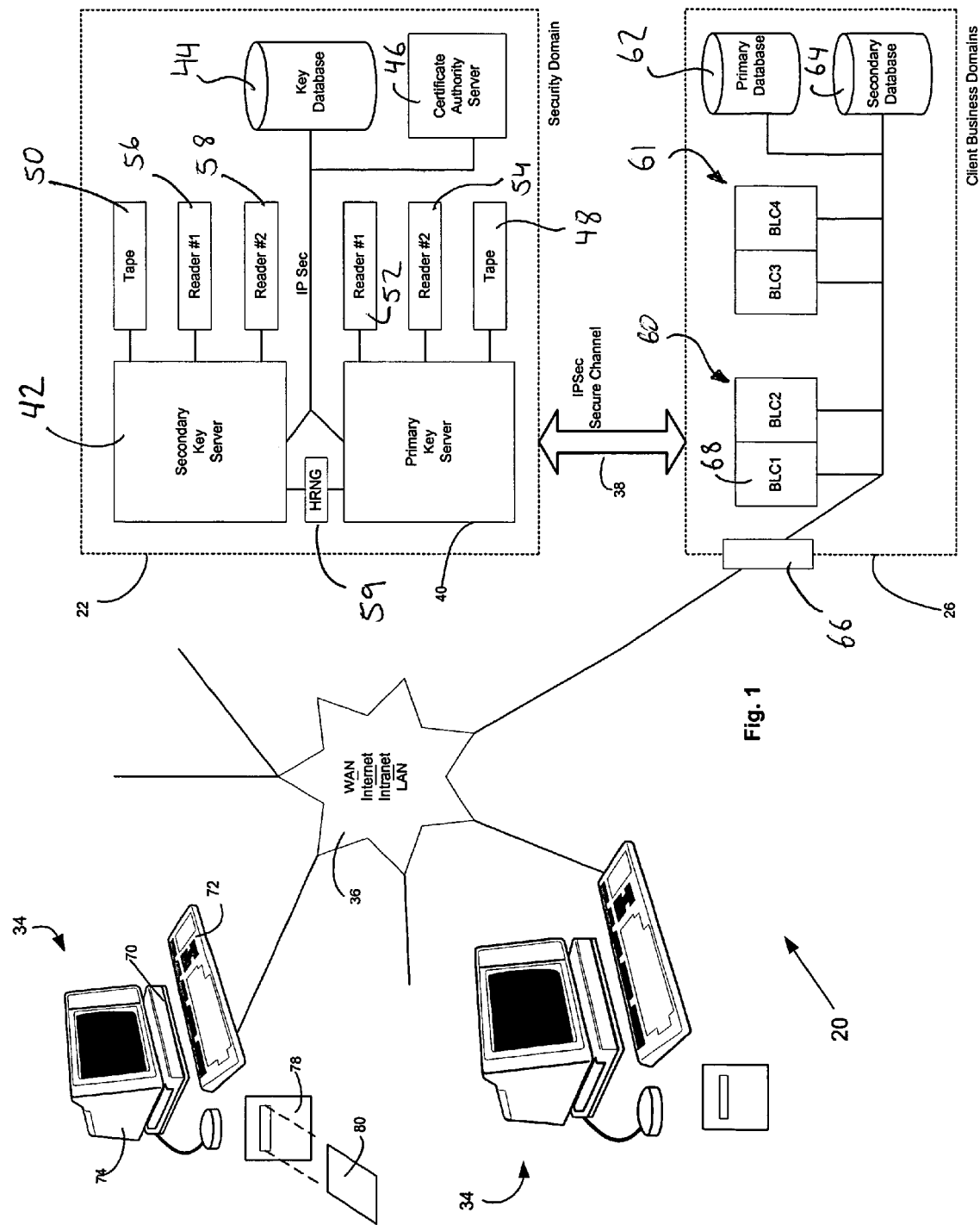
FIG. 1 is a schematic diagram of a computer system implementing a hidden link dynamic key manager according to the present invention.
Figure 2:
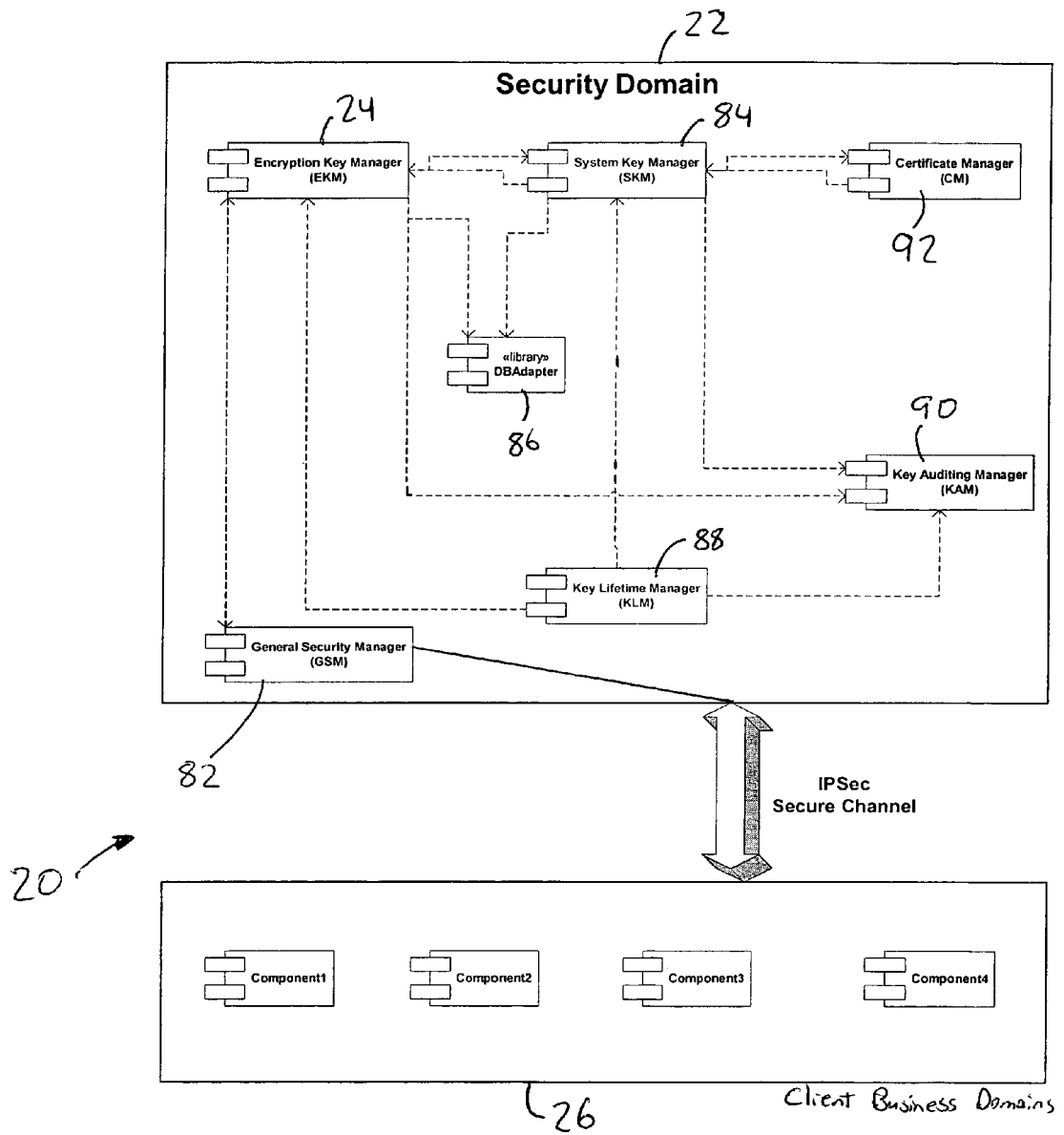
FIG. 2 is a schematic block diagram of the computer system of FIG. 1 illustrating software components of the computer system.

Referring to the drawings in greater detail, FIGS. 1 and 2 show a computer system 20 constructed in accordance with a preferred embodiment of the present invention for storing information. The present invention provides an improved method of encrypting and decrypting data preferably at rest. The computer system 20 broadly includes a security domain 22 having an encryption key manager (EKM) 24, system key manager (SKM) 84, key lifetime manager (KLM) 88, key auditing manager (KAM) 90 and database adapter (DBAD) 86. The computer system 20 also includes a plurality of client business domains 26 having an information database 28. The computer system 20 implements a method according to the present invention. The method broadly includes the encryption and storage of data entities 30 (FIG. 3) as illustrated in the flow diagram of FIG. 10, and the method also includes the retrieval and decryption of data for data manipulation. One embodiment of the retrieval and decryption method is illustrated in the flow diagram of FIG. 11. The computer system 20 utilizes a data structure illustrated in FIG. 3. The data structure broadly includes a plurality of data entities 30 having a security key identification attribute 32, which contains security key information as illustrated in FIG. 4.

Referring to FIG. 1, in addition to the security domain 22 and the client business domains 26, the computer system also includes a plurality of client terminals 34. The client terminals 34 are provided with telecommunications capabilities to communicate with the business domain 26, preferably through the Internet 36 utilizing PKI and SSL to provide security for communications between the client terminals 34 and the business domain 26. However, the invention also contemplates the use of dedicated communication lines, such as Intranet, local area networks (LAN), and wide area networks (WAN), for example. The Intranet, LAN, and WAN applications may be utilized for any type of facility or organization where data security is important such as a bank, hospital, or law firm, for example. The client terminals 34 gain access to the client business domains 26 only after passing through security protocols such as firewalls, and communication between the client business domain 26 and the security domain 22 preferably occurs through an Internet protocol secure, virtual private network tunnel (IPSEC, VPN tunnel) 38.

The security domain 22 includes a primary key server 40, a secondary key server 42, a security key database (KEYDB) 44, and a certificate authority server 46. Each of the key servers is provided with several conventional components including, for example, small computer system interface (SCSI) cards, security hardware adapters, dual 700 MHz processors, and mirrored 20 GB hard drives. The certificate server 46 also includes several conventional components including a SCSI card, single 700 MHz processor, and mirrored 30 GB hard drives. Preferably, component mutual authentication occurs between the security domain components. COM+, CORBA, or Java security can be used to control the mutual authentication.

The primary key server 40 and secondary key server 42 are mirror components. Thus, the primary and secondary key servers are substantially identical. If the primary key server 40 fails, the secondary key server 42 begins operation immediately without disruption in overall system operation, thereby providing superior fault tolerance. The transfer in operation is accomplished through a heart beat failover channel between the primary and secondary servers 40, 42. The primary and secondary servers 40, 42 each include a tape backup 48, 50, respectively, for key retrieval in the event that the KEYDB 44 is irretrievable or a key integrity check is failed. The primary server 40 is provided with a primary system key reader 52, designated reader #1 in the drawing, and a primary encryption key reader 54, designated reader #2 in the drawing. Preferably, each of the primary readers 52, 54 for the primary server 40 store the same information. Thus, the primary readers 52, 54 are mirrored hardware components for superior fault tolerance. The secondary database 42 also includes a secondary system key reader 56, designated reader #1 in the drawing, and a secondary encryption key reader 58, designated reader #2 in the drawing. Preferably, each of the secondary readers 56, 58 for the secondary server 42 store the same information. Thus, the secondary readers 56, 58 are also mirrored, and there are a total of four readers from which key information can be retrieved. The readers 52-58 comprise security token readers for receiving security tokens. Preferably, the readers comprise Smart Card readers for receiving smart cards. A hardware random number generator (HRNG) 59 is also provided in the security domain to generate random numbers, which are used as identifiers for keys. While a software random number generator could be used, the HRNG 59 is preferred for its increased speed.

The KEYDB 44 comprises an external disk array with a fault tolerance system for mirrored operation providing superior fault tolerance. The external disk array includes a redundant array of independent disks (RAID) preferably including five (5) disks. The KEYDB is preferably operated at RAID level 5, which provides data striping at the byte level and also stripe error correction information. Each of the key servers 40, 42 is operable to communicate with the KEYDB 44 through IP and utilizing mutual authentication as described above.

The client business domains 26 preferably include a plurality of client servers 60, 61 and an information database 62, which is isolated from the KEYDB 44. Preferably, a backup information database 64 is also provided. The backup information database 64 mirrors the primary information data 62 providing redundancy and protection against data loss. Thus, the client business domains 26 are provided with superior fault tolerance. For added security, the client business domain servers 60, 61 are only accessible through a firewall 66. Each client server 60, 61 may contain multiple business logic components such as business logic component number one (BLC1) 68. The BLC's contain instructions and rules for operation of the computer system 20 that are set by the client. Thus, the BLC's provide the client with the authority to make decisions about certain optional features of system operation.

Generally, each client terminal 34 will include a central processing unit (CPU) 70, a data entry mechanism, such as a keyboard 72, and a display or monitor 74. The CPU 70 is operable to control the monitor 74, receive input from the keyboard 72, and establish and maintain communications through the Internet 36 utilizing a modem, two-way satellite, SDL, or other communication apparatus (not shown). The CPU 70 is also operable to control other computer system devices such as a printer or disc drives. Preferably, each client terminal is also equipped with a user security token reader for receiving a security token. In a preferred embodiment, the security token reader comprises a Smart Card reader 78 for receiving a Smart Card 80. The Smart Card reader 78 is provided with a private and secured file system. Each client user is preferably provided with his or her own Smart Card 80, which includes a user digital certificate for identifying and authenticating the user. Other known solutions, such as user identification and password, can be used to control access and user authentication. Each user preferably has one or more roles for authorization. The role identifications can include assistant level, receptionist level, administrative level, and others. The role identifications represent the duties performed by individuals in those levels and the extent of information needed for them to properly perform those duties. The user and role identifications are used as described below in connection with FIG. 7 to limit access to information.

Referring to FIG. 2, the security domain 22 of the computer system 20 includes several software components that are resident on the hardware components illustrated in FIG. 1. The primary and secondary key servers 40, 42 include substantially the same software components and both will be described with reference to the primary key server 40. The primary key server 40 includes several software components: a general security manager (GSM) 82, the encryption key manager (EKM) 24, a system key manager (SKM) 84, a database adapter (DBAD) 86, a key lifetime manager (KLM) 88, and a key auditing manager (KAM) 90. A certificate manager (CM) 92 is provided on the private certificate authority (CA) server 46.

The general security manager (GSM) 82 operates as a gateway to the portions of the computer system 20 located in the security domain 22. To that end, each of the security domain 22 components EKM 24, SKM 84, DBAD 86, KLM 88, KAM 90, CM 92 are preferably not operable to communicate directly with any component outside the security domain 22 of the computer system 20. They are only operable to communicate with outside components through the GSM 82. Preferably, component mutual authentication occurs between the GSM 82, which is located in the security domain, and the outside business domain components 68. COM+, CORBA, or Java security can be used to control the mutual authentication. Thus, neither the client user nor any component in the client business domain 26 can contact anything other than the GSM 82 through trusted authentication process.

The GSM 82 is also operable to encrypt the data entities 30 (FIG. 3) using a triple data encryption standard (3DES), RC4, or any strong symmetric cryptography algorithm on selected attributes of the data entities 30C, 30D as directed and requested by the BLC's and other components of the computer system 20. Thus, while DES uses symmetric 64-bit key encryption, the GSM uses 3DES or symmetric 192-bit key encryption. Using encryption keys with these extended lengths makes the keys more difficult to break. The GSM 82 also performs the decryption of the data entities 30 when other components of the computer system 20 request decryption. Further, the GSM 82 is operable to perform hashing operations using message digest (MD5), SHA-1, or other strong hashing algorithms as instructed by other components. The hash values or integrity values generated in the one way hashing process are typically stored as attributes in data entities for integrity check purposes. Preferably, the GSM 82 hashes all of the data attributes of the data entities and stores that data hash value as an attribute. After the data has been decrypted, it is again hashed and the before and after hash values are compared. If the two hash values are identical, the integrity of the data in the data entity has been confirmed. If two hash values are different, an alarm is issued and the data is retrieved from the backup information database 64.

The encryption key manager (EKM) 24, as its name indicates, generally manages encryption keys, which as described below are used to encrypt and decrypt the data entities 30C, 30D. Thus, the EKM 24 is operable to generate multiple session encryption keys (SEK) using either 3DES or RC4 and generate session encryption key identifications (SEKID's) for the SEK's. The SEKID's are random numbers preferably generated with the HRNG 59 (Hardware Random Number Generator). Because the SEK's are rotating and dynamic, as will be more fully described below, they are referred to as session encryption keys because a new SEK will be generated, at a minimum, for each new client user session or request within that session. Therefore, the EKM 24 is operable to instruct the computer system to change or rotate SEK's when a rotation event occurs, such as beginning a new user session. Preferably, new SEK's will be generated more frequently as described below, so the SEK's are more appropriately and generally referred to as encryption keys. However, for clarity, they will generally be referred to in the specification as SEK's with the understanding that the broader encryption key meaning is included. The EKM is operable to perform integrity checks on the SEK's using hash values for the SEK's. The EKM is further operable to transmit the SEKID to the SKM 84 for encryption, and the EKM 24 is also operable to transmit the SEK and corresponding SEKID, in encrypted form, to the GSM 82, which then encrypts the data entities 30C, 30D using the SEK.

The system key manager (SKM) 84 generally manages system keys, which as described below are used to encrypt the SEKID's. Thus, the SKM 84 is operable to generate the system keys using strong encryption. Preferably, the SKM generates strong PKI 1024-bit keys for the system keys. Thus, the system keys preferably utilize asymmetric encryption, so that there is a public key and a private key for every system key. The SKM also generates a system key common name (SKCN) for each of the system keys. The SKCN's are generated when generating the system key's PKI digital certificate, so that there is a unique SKCN for each system key. The SKM is operable to receive the SEKID from the EKM 24 and encrypt the SEKID using its public key. Upon request from the EKM 24, the SKM 84 is also operable to decrypt the SEKID using its private key. If desired, the SKM 84 and EKM 24 can be combined into a single component and can reside on the same server or CPU.

In a preferred embodiment utilizing Microsoft Crypto API (application program interface), the GSM 82 is also operable to encrypt the SEK's with an EKM internal digital certificate public key and decrypt the SEK's with an EKM internal certificate private key. The EKM internal digital certificate is stored in a certificate store, preferably the primary encryption key reader 54. The system key digital certificate is also stored in a certificate store, preferably the primary system key reader 52. Because of the requirement of verification by the private certificate authority, the system key and EKM certificate are obsolete outside the security domain 22. This also requires that the decryption methods described below occur during computer system operation. That is, during system run time.

The key lifetime manager (KLM) 88 monitors the lifetime of the SEK's and system keys based on their expiration dates and timestamps. Preferably, the KLM 88 flags the expired SEK's with an expiration flag, so that in the next request, the EKM will check the expiration status of the SEK and replace the expired key with a new one during run-time operation. Alternatively, the KLM 88 is operable to deactivate expired SEK's and generate replacement SEK's. To immediately deactivate the SEK's, all data encrypted by the SEK's is retrieved and encrypted with a new SEK. However, immediate deactivation of the SEK's requires the KLM 88 to control access to the information database 62. Thus, run-time or call-up deactivation is preferred. The KLM 88 also instructs the computer system to generate new system keys. However, because of the number of SEKID's encrypted by the system keys, the system keys are preferably not deactivated.

The key auditing manager (KAM) 90 is operable to maintain an active audit log including all transactions involving the SEK's and the system keys. Generally, the KAM 90 monitors the log for alarm events utilizing smart patterns, rules, and policies. The KAM 90 is also operable to provide notification upon the occurrence of an alarm event, and if a system key or SEK has been compromised, the KAM 90 is operable to instruct the EKM 24 or SKM 84 to change and/or deactivate the SEK's or system keys.

The certificate manager (CM) 92 is operable to perform all of the system key PKI related operations. For each system key the CM 92 generates a X.509 digital certificate. Preferably, the digital certificate includes a critical V3 extension, so that only the private certificate authority (CA) can verify the key. Each time a request for decryption by a system key is received by the SKM 84, the CM communicates with the private certificate authority (CA), which is local to the security domain, to verify the system key.

The database adapter (DBAD) 86 is operable to hide database specific application programming interfaces (API) from the security domain 22 components and thereby controls and enhances communications between the key managers 24, 84 and the secured key database 44. Thus, by using different DBAD's, the security domain components can interface with different types of databases. A preferred database is a VERSANT object oriented database management system having built in fault tolerance, scalability, object level locking, an object cache, parallel query engine, and other features. The DBAD 86 also allows the security domain components to interface with multiple databases within the security domain 22, such as Microsoft SQLServer, Sybase, Informix, Oracle, and IBM DB2. Thus, the DBAD 86 is operative to switch to a backup database should a primary database fail, and when the primary database is restored, all transactions are updated to the primary database, which again takes control. Preferably, the switch from the primary database to the backup database takes place without any delay. While the preferred operations and locations of the respective components has been described in detail, it is understood that specific tasks can be exchanged between components and the locations of components can be combined, separated, or exchanged without departing form the spirit of the invention.

Figure 3:
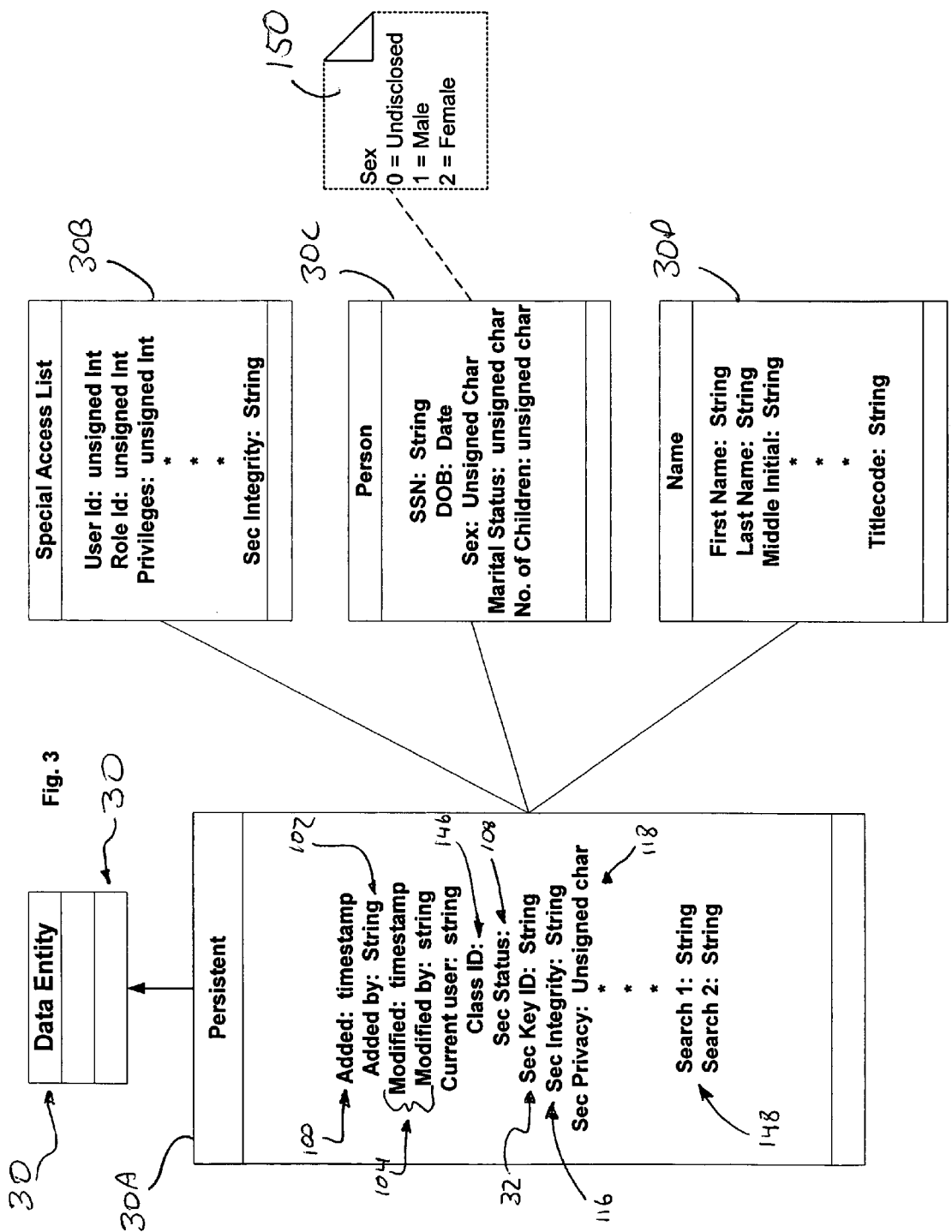
FIG. 3 is a schematic diagram of the database structure according to the present invention and utilized by the computer system of FIG. 1.

Referring to FIG. 3, the database structure preferably comprises an object oriented database structure having a plurality of data entities 30, which are preferably data objects. However, other types of databases are contemplated by the invention. For example a relational database could be used, such as Microsoft SQLServer, Oracle, Sybase, Informix and IBM DB2. Thus, when the term "object" is used, its counterparts, "record" for example, are also contemplated, and when the term class is used, its counterparts, "table" for example, are also contemplated.

One of the data entities 30A, specifically a persistent data entity, is shown in detail. The data entity 30A includes an Added 100 and an Added By attributes 102. The Added attribute 100 records a timestamp containing the date and time the object was added, and the Added By attribute 102 records the digital signature of the user adding the record or data entity. The digital signature is derived from the digital certificate of the client user's Smart Card 80 or client's current session and user identification. The Modified and Modified By attributes, collectively 104, record the same information for modifications to the data entity 30A. In combination, these non-repudiation attributes 100, 102, 104 inhibit a client user from claiming that the user did not take a certain action. The security status (SecStatus) attribute 108 indicates whether the data object contains plain text or cipher text and whether it is public or private.

Referring additionally to FIG. 4, a security key identification attribute 32 is also an attribute of the data entity 30A and contains security key information. The security key information includes the encrypted SEKID 112 and the SKCN hash value 114, which are used, as described below, to find the SEK used to encrypt associated data entities 30C, 30D and to find the system key used to encrypt the SEKID 112. While it is preferred that the SKCN hash value is stored in the security key attribute 32, the SKCN could be stored in this location without hashing.

Referring again to FIG. 3, the data entity 30A also includes a security integrity attribute (SecIntegrity) 116, which contains the data entity hash value. The data entity hash value is obtained by hashing all or selective attributes within the data entity. This is controlled by business needs and policies, which are preferably determined by the client and recorded in the BLC's. When a data entity is retrieved, it is hashed using MD5 and that data entity hash value is compared with the stored hash value in the security integrity attribute 116. If the hash values are the same, then the integrity of the retrieved data entity is confirmed to be correct and not altered. If the hash values are not identical, then an alarm is issued, so that the data can be manually confirmed, and as described above, retrieved from the backup information database 62.

Figure 7:
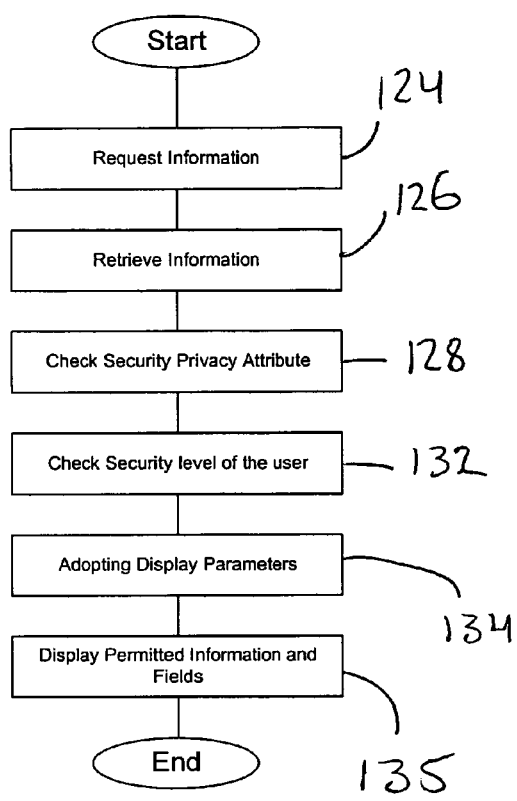
FIG. 7 is a schematic block diagram illustrating the steps for determining how to adapt the display parameters illustrated in FIGS. 5 and 6.

Referring additionally to FIGS. 5, 6, and 7, a security privacy attribute 118 controls access to the information in the associated data entities 30C, 30D. When a client user, a doctor for example, marks his information private, a special access list (SAL), data entity/class 30B is automatically created and the doctor is automatically added to the special access list. The doctor can thereafter add and delete user identifications attributes 120 and/or role identifications 122 from the special access list. The user attributes 120 are based on specific user identifications from the smart cards or any other authentication method. The role attributes 122 are based on different security levels of users. For example, the doctor may grant permission to view private data to other doctors but not permit nurses to view private data. The roles can include any security level: secretary, shareholder, custodian, and administrative, for example. In this fashion, the doctor controls who can view what information and who can edit what information. The same holds true for patient records; where nurses and doctors may have full access, clerical staff may have limited access to name, address, payment, and appointment information. This privacy can be applied to any vertical market such as banking, intellectual property systems, e-Commerce, law firms, and all applications that deal with highly sensitive or classified information.

When an authenticated client user requests information at step 124 in FIG. 7, the computer system retrieves the information at step 126, which will be described in greater detail below. After the information is retrieved, the system checks the security privacy attribute 118 at step 128. If the information is not marked private, it is fully displayed on the monitor 130 as illustrated in FIG. 6. If the information is marked private, the system checks the security level of the client user at step 132. In checking the user's security level, the system looks at both the user identification and the role identification to see if either are in the special access list, and determine what rights, such as view only or edit, the user has to the information. If the client user has full view rights, then the display of FIG. 6 is again shown. If the client user is not entitled to view the private information, the display parameters are adapted in step 134. In step 134, the display fields of the private information, which will not be displayed, are eliminated from the display parameters with their related labels, so that when the permitted information is displayed in step 135 on monitor 136 of FIG. 5, the fields for the private information are not displayed.

Further, it is envisioned that the fields for the public information may be modified, so that the existence of the private information is completely masked. In the example shown, personal information 138, such as data of birth and number of children are displayed for the user having access to private information. However, for a user without authorization to view the private information, the date of birth and number of children fields are removed from the display of FIG. 5. Further, the home address information 140 and work address information 142 are displayed for the user with authorization to view private information, and the fields specifically indicate which address is for work and which address is for home. In contrast, the user without access to private information not only does not see the home address, the work address fields 144 in FIG. 5 are modified to eliminate the designation that it is a work address.

Referring again exclusively to FIG. 3, the persistent data entity 30A also includes several association attributes, which are used by the database schema to associate or link related data entities 30B, 30C, 30D to the persistent data entities 30A. To that end, the persistent object 30A includes a class identification attribute 146 and at least two search attributes 148. For faster and secured searching, the searchable attributes 148 are preferably hash values of user information such as the patient name. The database uses these attributes 146, 148 and others to associate related persistent objects 30A and related class objects 30B, 30C, 30D with the persistent objects containing the appropriate security key identification 32 that was used to encrypt data attributes in the class objects. Two exemplary class objects are shown in FIG. 3: a person class object 30C and a name class object 30D. Other unillustrated class objects/entities include an address entity, employer entity, payment entity, insurance entity, and others.

The database is also provided with look up maps or notes 150. The illustrated lookup map 150 is for gender of the person class. This saves database resources because every person in the database simply has a 0, 1, or 2 corresponding to undisclosed, male, or female, respectively. Thus, the look up map 150 saves database resources because each person class has a single digit integer instead of a lengthy word entry. Look up maps are also preferably used for the security status attribute 108, the security privacy attribute 118, and others.

Referring to FIGS. 8 and 9, the data structure also includes an SEK object 151 saved in the KEKDB 44 and a SKCN object 152, which is saved in either the KEKDB 44 or in an alternate embodiment, a separate system key database (not shown). Thus, for increased security, several of the data entities are stored in separate databases. The SEK object/entity includes as attributes the SEKID 153 in a normal/decrypted form, the SEK 154, the SEK integrity check 155, which is a hash value of the SEK, and the SKCN hash value 156. The SEK data entity 151 preferably does not include the encrypted SEKID. This creates a hidden link between the encrypted data and the SEK used to encrypt it because the SEKID is encrypted, and the SEK is stored in a separate database. The SEK object also includes a Created On attribute 159, which records a time stamp for the creation of the SEK and a Last Usage Date attribute 161, which records a time stamp for the last time the SEK was used. Additionally, the SEK object preferably has a Usage Counter attribute 163, which records how many times the SEK has been used. The Created On 159, Last Usage Date 161, and Usage Counter 163 attributes provide the client with optional feature selections. Specifically, the client can select to have keys expired a certain number of months, two months for example, after their creation. The client can also preferably decide to have SEK's expire when they have not been used for a selected period of time or when they have been used more than a selected number of times. The client can also choose to have SEK's expired randomly. The SKCN object/entity includes the SKCN hash value 157 and the SKCN 158 as attributes, and is preferably stored in a database separate from the data entities 30.

The above described computer system and database structure are utilized in the method of encrypting, storing, retrieving, and decrypting data. When a client user requests a data manipulation including add, update, and view requests, the computer system will implement the appropriate steps. For each transaction, it is assumed that the client user has already gained access to the business domain using a trusted authentication method, such as smart cards or two-factor authentication devices.

Figure 10:
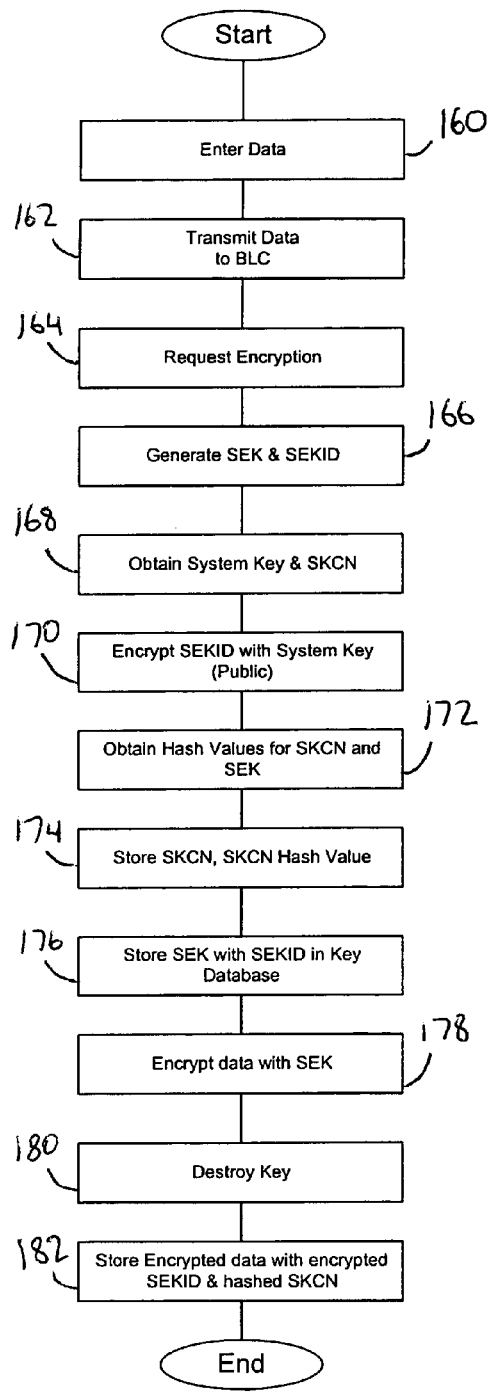
FIG. 10 is a schematic block diagram illustrating the encryption and storage of data entities during an add transaction.

In FIG. 10, the first step 160 in the add transaction is the entry of data by the client user into the client's browser. In step 162, the entered data is then transmitted to the business logic component (BLC) 68 for the client. The BLC 68 then in step 164 requests that the GSM 82 encrypt the data in accordance with the business rules as set by the client. The business rules, which the client can amend, will determine which attributes of the data will be encrypted. The GSM 82 then request that the EKM 24 generate a SEK in step 166. In step 166, the EKM generates the SEK and has the HRNG 59 generate the SEKID. The EKM then request the SKM 84 to encrypt the SEKID with a system key. The SKM 84 obtains the current system key and SKCN from the security domain primary, system Smart Card reader 52 and card in step 168. The SKM 84 then encrypts the SEKID in step 170. The method preferably uses asymmetric encryption of the SEKID, so the SEKID is preferably encrypted by the public key of the system key in step 170 and returned to the EKM 24. The GSM 82 then hashes the SKCN and SEK to obtain the respective hash values in step 172. The SKCN and SKCN hash value are then stored in the SKCN data entity 152 in step 174. Next, in step 176, the SEK, SEKID, SKCN hash value, and SEK hash value are stored as attributes of the SEK data entity 151 in the KEYDB 44. The GSM 82 then, in accordance with the business rules of the BLC 68 encrypts the data entities 30C, 30D with the SEK in step 178, and the SEK is destroyed from memory in step 180. In step 182, the encrypted data entities 30C, 30D and their associated persistent data entity 30A are then stored in the information database 62 corresponding to the client BLC 68. The information is also stored in the backup information database 64. It is understood that operations are performed simultaneously on the mirror components of the system and that information can be retrieved from the mirror components if the primary components fail; therefore, further discussion of the operation of the mirrored components is omitted. The encrypted SEKID 112 and the SKCN hash value 114 are stored in the security key identification attribute 32 of the persistent data entity 30A.

Referring to FIG. 11, the update and view types of data manipulation requests begin with the client user requesting the data manipulation in step 184 based on searchable information such as customer name. The searchable information is hashed in step 186, and a search query is issued in step 188 to the information database 62 to find persistent objects/entities with matching hash values in the searchable attributes 148. Matching persistent objects 30A are returned with the associated data classes 30C, 30D, and in step 190, the security key information including the SCKN hash values 114 and encrypted SEKID's 112 are obtained form the security key identification attributes 32 of the persistent entities 30A. The BLC 66 then sends a decrypt request to security domain 22 through the GSM 82. The GSM 82 extracts the encrypted SEKID 112 from the data entity. A search query 192 is then issued to the KEYDB 44 using the SCKN hash values to obtain the SKCN's from the KEYDB. With the SKCN's, the private system keys are obtained in step 194 from the security domain Smart Card reader 52 and card. The SKM 84 and the CM 92 confirm the digital certificates of the system keys at step 196. The SEKID's are then decrypted with the appropriate system key's private key in step 198. A search query 200 is again issued to the KEYDB 44 using the decrypted SEKID's to obtain the SEK's.

The SEK's are then hashed in step 202 and the hash values are compared with the hash values obtained from the security integrity attributes 155 of the persistent SEK objects 151. If the pairs of hash values are the same, then the correct SEK's have been obtained for decryption, and the GSM decrypts the data entities 30C, 30D with the SEK's in step 204. If the hash values are different, an alarm is sent indicating that the key has been corrupted. To decrypt the data entity in the event of a corrupted SEK, the correct SEK is obtained from the primary backup tape 48. The SEK obtained form the backup tape is hashed and the hash value is again compared with the security integrity attribute 155 to confirm the SEK's integrity. If necessary, the SEK can be obtained from the secondary backup tape 50. Finally, the decrypted data entities are transmitted to the business domain BLC 66 through IPSEC VPN tunnel and then to the client terminal 34 utilizing PKI in step 206.

FIG. 12 illustrates an alternate embodiment for the update and view type data manipulations. The first three steps, transmitting the request 208, hashing the searchable information 210, and searching for matching hash values in the persistent objects 212, are substantially the same as in the previous embodiment of FIG. 11. In the embodiment of FIG. 12, the retrieved data entities are transmitted to the client's terminal at step 214. The client CPU 70 then obtains the security key information from the persistent entities 30A in step 216. In step 218, the SKCN hash values and encrypted SEKID's are transmitted back to the GSM 82. The SKM searches for matching SKCN hash values at step 220 and obtains the private system key in step 222. The SEKID's are decrypted at step 224 with the private system keys, and the SEK's are obtained in steps 226. In this embodiment, the SEK's are then transmitted to the client terminal using 128-bit SSL or IPSEC VPN at step 228. If desired, the SEK's are subjected to an integrity check, and then the client CPU uses the SEK's to decrypt the previously transmitted encrypted data entities in step 230.

As briefly indicated above, the SEK is preferably rotating and dynamic. The SEK is rotating in that the SEK changes to a new SEK upon the occurrence of a rotating event. One rotating event is the beginning of a new session by a client user. However, rotating events that occur more frequently are preferred. For example, a new SEK would be requested each time the user entered a request or every time the user changed data entry fields on the browser. Thus, the SEK's are high frequency rotating, and it is likely that the same customer or patient information will be encrypted by multiple SEK's. Additionally, when an individual customer's information is updated, the SEK would be different from when that customer's information was first added, again leading to the same customer's information being encrypted by different SEK's. The system key is also rotating, though preferably on a low frequency basis, so that it is also likely that different SEKID's relating to an individual customer's information are encrypted by different system keys.

Figure 13:
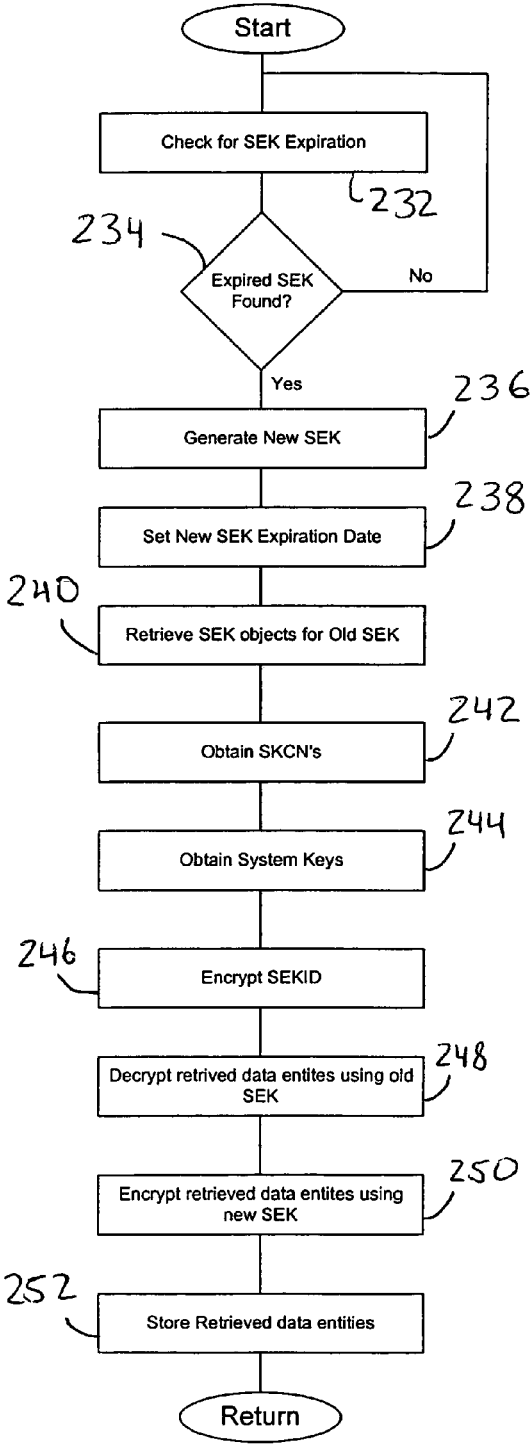
FIG. 13 is a schematic block diagram illustrating the deactivation of session encryption keys.

The SEK may also be dynamic, so that when an SEK is expired, it is also deactivated or replaced as illustrated in FIG. 13. The KLM 88 checks the SEK's for expiration in step 232. If no expired SEK is found in step 234, the KLM continues checking. When the KLM 88 finds an expired SEK, the KLM requests that the EKM 24 generate a new SEK in step 236. The EKM 24 also has the HRNG 59 generate a new SEKID for the new SEK. In step 238 the EKM sets an expiration date for the new SEK. In step 240, the SEK object 151 for the expired SEK are retrieved from the SKD 44 using the SEKID of the expired SEK. The SKCN's are then obtained in step 242 using the SKCN hash values stored in the SEK objects. Next, the public system keys are obtained from the security domain Smart Card reader 52 in step 244, and the public system keys are used to encrypt the SEKID. A query 246 is then issued to the information database 62 for matching SEKID encryption values. The data entities using the old SEK are thus retrieved and decrypted in step 248. The data entities are then encrypted at step 250 using the new SEK, and the data entities are stored in step 252 including the new security key identification 32. The same process occurs if the KAM 90 issues an alarm and a user instructs the system to deactivate the SEK. Again because of the great number of SEKID's encrypted by a single system key, the system key is preferably not dynamic. The system key is preferably only low frequency rotating. However, in the unlikely event of a clear compromise of a system key, the system key can be deactivated.

Figure 14:
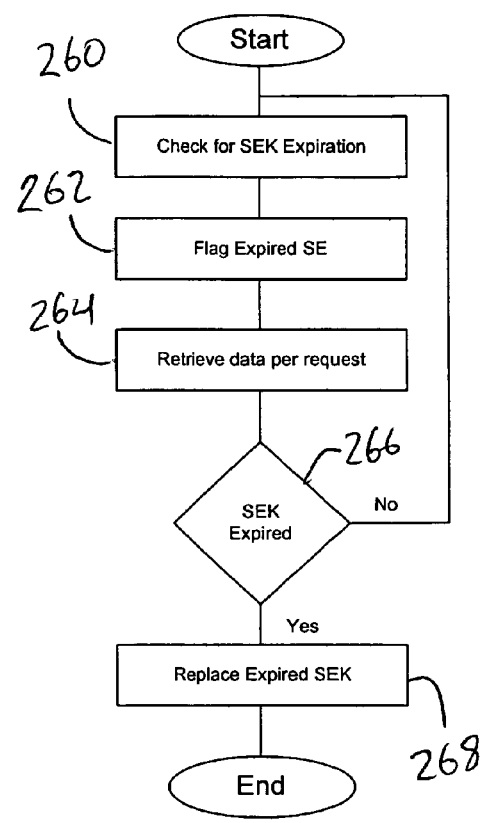
FIG. 14 is a schematic block diagram illustrating an alternate embodiment for the deactivation of session encryption keys.

In an alternate embodiment illustrated in FIG. 14, the KLM also checks the SEK's for expiration at step 260. However, in step 262 when the KLM finds an expired SEK, the KLM marks that SEK as expired in the KEYDB 44. In the next customer request at step 264, the data is retrieved according to the request, and then in step 266, the SEK is checked to see if it is flagged as expired. If the SEK is not flagged, the computer system 20 continues as previously described. If the SEK is flagged, the EKM will replace the expired key with a new one at step 268. This embodiment further fragments the data from the perspective of increasing the number of SEK's used to encrypt data. Further, in this embodiment, the SEK is dynamic in that it is deactivated as data is called up in contrast to the previous embodiment of FIG. 13 where the SEK is immediately and simultaneously deactivated from all data entities using the expired SEK. Thus, the embodiment of FIG. 13 utilizes immediate and simultaneous deactivation while the embodiment of FIG. 14 uses call up deactivation. The system keys are only deactivated as the new SEKID's are used. That is, when an SEK is deactivated and a new SEKID must be encrypted for storage in the security key identification attribute 32, the then current system key is used to encrypt the new SEKID. Thus, that instance of an old system key is deactivated and the low frequency rotating system keys are preferably not dynamic.

The computer system 20, database structure, and method according to the present invention provide an information storage and retrieval system that is superior to previous encryption concepts. For a person to decrypt a single customer's information, the hacker would have to penetrate the GSM 82 to gain access to the security domain. Next, the hacker would have to find a way through the IPSEC channel to the information database 62. The hacker would have to trace all associations to find all persistent data entities 30A and associated data entities 30B, 30C. The hacker would then have to check each data entity to see whether or not it is encrypted. The hacker would have to locate the security key identification attribute 32 and extract both the encrypted SEKID and the hashed SKCN. The hacker would then have to gain access to the secure key database within the security domain and search for the security system key common names. Additionally, there may be more than one security system key common name hash value, so the hacker must obtain more than one security system key common name. After obtaining the security system key common name, the hacker would have to gain access to the security domain Smart Card reader to obtain the system key. The system key would then have to be authenticated by the private certificate authority. In the extremely unlikely event that the hacker is able to complete these steps, the hacker would have to use the system key to decrypt the appropriate SEKID's for every data entity using the authenticated and related system key. The hacker would again have to gain access to the KEKDB 44 inside the security domain and obtain the SEK's based on the SEKID's. With the security protocols in place in the security domain, the completion of all these tasks without detection is essentially an impossible task. If a hacker attempts a more direct approach attempting to break the keys, the hacker will have no more success. Because the computer system and method utilizes 3DES or RC4 encryption it would take a hacker an extended period of time to crack even one of the SEK's, and because a single patient's records may be encrypted using several SEK's the hacker may spend the rest of his or her life trying to obtain one patient's record. Making the task even more daunting is the need to break at least one 1024-bit system key. All of which must be performed without being detected by the KAM 90, or intrusion detection software within the security domain.

If a hacker attempts to download the information database 62 and attack the SEK's, the hacker will have to break many SEK's to obtain a single customer's record, and because the hacker will likely not know which data entities are related to the customer, the hacker will likely have to break hundreds of SEK's before obtaining that single customer's record. To obtain all of the customers' records, the hacker will have to break potentially millions of SEK's depending on database size. If the hacker also attempts to and successfully downloads the KEYDB 44 from the security domain 22, the hacker will have to break the even stronger asymmetric system keys to decrypt the SEKID's. If the Microsoft Crypto API is utilized, the hacker would also have to break the EKM certificate asymmetric keys, which also are preferably 1024-bit keys. To avoid having to break the system and EKM keys, the hacker would also have to steal the certificate stores. Because the system and EKM keys are only found in the smart card readers 52, 54, (they are deleted from all other memory i.e. RAM after use). The hacker would essentially have to gain physical access to the smart card readers 52, 54, and reconstruct the security domain 22 and simulate system run time.

Thus, a hidden link dynamic key manager for use in computer systems with database structure for storage of encrypted data and method for storage and retrieval of encrypted data is disclosed which utilizes an encryption key identification encrypted by a system key and a hashed system key common name stored in association with encrypted data to inhibit unauthorized access to the data thereby providing a more secure encryption of data at rest. While preferred embodiments and particular applications of this invention have been shown and described, it is apparent to those skilled in the art that many other modifications and applications of this invention are possible without departing from the inventive concepts herein. For example, different types and forms of databases can be used, and the invention can be applied to data being transmitted. Additionally, the disclosed application for the encryption system, though not described in detail, is for patient medical records. Because of their sensitive nature, the encryption system is particularly useful for patient medical records. However, the described encryption system and method have applications to any type of information including bank accounts, internet customer accounts, and others whether they are transmitted and used in the Internet context or simply in a CPU context. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

GLOSSARY

Asymmetric Key Encryption:
    An encryption system in which the data is encrypted with a first public key and decrypted with a second private key.

Attribute/Field:
    A category of data saved in an object.

Business Logic Component (BLC):
A component in the computer system accessible by the client to establish and change business rules controlling operation of the system and what data will or will not be encrypted.

Certificate Manager (CM):
Controls the system key PKI related operations and communicates with the private certificate authority responsible for issuing and verifying digital certificates for the system keys.

Cipher Text:
Encrypted data

Class:
According to object-oriented programming, a category of objects.

Database Adapter (DBAD):
Software component, which allows the security domain components to save and retrieve data on various types of databases and multiple databases.

Data Encryption Standard (DES):
A symmetric-key cushion method using a 64-bit key.

Decryption:
Changing data from cipher text to plain text.

Digital Certificate:
An attachment to an electronic message used for security purposes. A typical digital certificate includes certificate holder information, a public key, the certificate issuer, and the serial number for the certificate.

Encryption:
The translation of data into a secret code.

Encryption Key Manager (EKM):
A software component of the computer system, which manages the session encryption keys including generation, replacing, and other tasks.

Fault Tolerance:
The ability of a system to continue operation in the event of unexpected hardware or software failures. Many fault-tolerant computer systems mirror/duplicate all operations.

General Security Manager (GSM):
A software component, which operates as a gatekeeper to the security domain and performs hashing, encryption and decryption functions.

Hardware Random Number Generator (HRNG):
A device used to generate numbers randomly for the SEKID.

Hashing:
Generating a number from a string of text that is substantially smaller than the text itself. The hash value is an irreversible encryption in that the resulting hash value cannot be reversed. The hash value or integrity value is used for search queries and for security integrity checks.

Internet Protocol (IP):
Specifies the format of information and the addressing scheme for transmission of information over the Internet.

Internet Protocol Security (IPSEC):
A set of protocols to support secure exchanges of information at the Internet protocol layer.

IP Spoofing:
Attempting to make a message appear as if it came from an authorized Internet protocol address.

Key:
A password or table needed to decipher encrypted data.

Key Auditing Manager (KAM):
Maintains an active audit log about all EKM and SKM operations with the ability to send alarms and notifications to recipients based on policies and rules.

Key Lifetime Manager (KLM):
Monitors the SEK's for expiration and deactivates expired SEK's or alternatively flags SEK's to be deactivated in the next request or call.

Memory (RAM):
Random access memory.

Message Digest 5 (MD5):
A one-way hash function, meaning that it takes a message and converts it into a fixed string of digits, also called a message digest.

Object:
A self-contained entity consisting of both data and procedures to manipulate the data.

Object Oriented:
Refers to a special type of programming that combines data structures with functions to create reusable objects.

Plain Text:
Unencrypted data.

Public Key Infrastructure (PKI):
A system of digital certificates, certificate authorities, and other registration authorities that verify and authenticate the validity and identity of parties involved in Internet transactions.

Secure Hash Algorithm (SHA-1):
Another one-way hash function.

Secure Key Database (KEYDB):
A database inside the security domain on which the SEK's and SEKID's are saved.

Secure Sockets Layer (SSL):
A protocol developed for transmitting secured information via the public Internet.

Session Encryption Key (SEK):
A rotating and dynamic encryption key used to encrypt data entities.

Session Encryption Key Identification (SEKID):
A randomly generated identification number for the SEK.

Smart Card:
A small electronic device about the size of a credit card that contains electronic memory. It may include an integrated circuit.

Symmetric Key Encryption:
An encryption system in which the data is encrypted and decrypted with a single key.

System Key:
  A PKI key that is used to encrypt and decrypt the SEKID's.

System Key Common Name (SKCN):
  System key digital certificate serial number and subject common name.

System Key Manager (SKM):
  Manages the system keys including generation, verification, and other tasks.

Virtual Private Network (VPN):
  A network constructed with public wires connecting nodes.

X.509:
  A widely use standard for defining digital certificates.

What is claimed is:

1. A computer readable medium containing a database structure for storage of encrypted data, the database structure comprising:
  at least one data entity encrypted by at least one encryption key, the data entity having at least one searchable attribute;
  at least one encryption key identification stored in association with the data entity for identifying the encryption key, wherein the encryption key identification is encrypted by a system key; and
  a system key common name also stored in association with the data entity for identifying the system key, wherein the system key common name is encrypted by a master key.

2. The computer readable medium according to claim 1 wherein the system key common name is hashed, and the database structure further comprises the system key common name hash value stored in association with the system key common name.

3. The computer readable medium according to claim 2 wherein the system key common name and the system key common name hash value are stored on a separate database from the at least one data entity.

4. The computer readable medium according to claim 1 wherein the at least one encryption key comprises a dynamic encryption key, and the at least one encryption key identification comprises a dynamic encryption key identification.

5. The computer readable medium according to claim 1 further comprising a plurality of data entities encrypted by a plurality of encryption keys, and a plurality of encryption key identifications.

6. The computer readable medium according to claim 5 wherein the plurality of encryption keys comprise dynamic encryption keys, and the plurality of encryption key identifications comprise dynamic encryption key identifications.

7. The computer readable medium according to claim 1 wherein the data structure further comprises a plurality of hash values with each of the searchable attributes having a corresponding hash value.

8. The computer readable medium according to claim 1 wherein the data structure further comprises at least one integrity attribute in association with the data entity.

9. The computer readable medium according to claim 1 wherein the data structure further comprises a security key attribute of the data entity, the security key attribute including the at least one encryption key identification and a system key common name.

10. The computer readable medium according to claim 1 further comprising a first database including the data entity and encryption key identification stored thereon and a second database including the encryption key stored thereon.

11. The computer readable medium according to claim 10 further comprising a security token including the system key stored thereon.

12. The computer readable medium according to claim 11 wherein the security token comprises a Smart Card reader.

13. The computer readable medium according to claim 1 wherein the at least one encryption key identification is stored as an attribute of the data entity.

14. The computer readable medium according to claim 1 wherein the data entity comprises a data object having a plurality of attributes.

15. The computer readable medium according to claim 1 further comprising a second data entity including as attributes the encryption key and the encryption key identification.

16. The computer readable medium according to claim 15 wherein the second data entity is stored on a separate isolated database from the at least one data entity.

17. The computer readable medium according to claim 1 further comprising a second data entity encrypted by a second encryption key, the second data entity having a second searchable attribute, and a second encryption key identification corresponding to the second encryption key; and wherein the at least one encryption key comprises a first encryption key and the at least one encryption key identification comprises a first encryption key identification.

18. The computer readable medium according to claim 17 wherein the second encryption key identification is stored as an attribute of the second data entity.

19. The computer readable medium according to claim 17 wherein the first and second encryption key identifications are encrypted by a system key having a system key common name.

20. The computer readable medium according to claim 19 wherein the system key comprises a public system key.

21. The computer readable medium according to claim 19 further comprising the system key common name stored as an attribute of the first and second data entities.

22. The computer readable medium according to claim 17 wherein the first encryption key identification is encrypted by a first system key, and the second encryption key identification is encrypted by a second system key.

23. The computer readable medium according to claim 17 wherein the first and second data entities contain information for an individual customer.

24. The computer readable medium according to claim 23 wherein the first data entity contains medical patient name information, and the second data entity contains medical patient address information.

25. A computer readable data transmission medium containing a data structure for encrypted data, the data structure comprising:
  at least one encryption key, the data entity having at least one searchable attribute;
  at least one encryption key identification stored in association with the data entity and for identifying the encryption key, wherein the encryption key identification is encrypted by a system key; and
  a system key common name also stored in association with the data entity for identifying the system key, wherein the system key common name is encrypted by a master key.

26. A method for storage and retrieval of encrypted data, the method comprising:
   encrypting a data entity with an encryption key having an encryption key identification;
   storing the encrypted data entity;
   encrypting the encryption key identification with a system key having a system key common name;
   encrypting the system key common name with a master key; and
   storing the encrypted encryption key identification and the encrypted system key common name in association with the encrypted data entity.

27. The method according to claim 26 further comprising:
   requesting a data manipulation using a searchable attribute;
   searching for matches to the searchable attribute;
   decrypting the system key common name using the master key;
   searching for the system key using the system key common name;
   decrypting the encryption key identification with the system key;
   searching for the encryption key using the encryption key identification; and
   decrypting the data entity with the encryption key.

28. The method according to claim 27 wherein requesting the data manipulation comprises requesting a data update of new information, and further comprising encrypting the new information with a second encryption key.

29. The method according to claim 27 wherein requesting the data manipulation comprises requesting an addition of new information, and further comprising encrypting the new information with a second encryption key.

30. The method according to claim 27 wherein requesting the data manipulation comprises requesting viewing of current information, and further comprising encrypting the viewed information with a second encryption key.

31. The method according to claim 26 further comprising storing the system key in a security token.

32. The method according to claim 26 wherein encrypting the encryption key identification with a system key comprises encrypting the encryption key identification with a system public key.

33. The method according to claim 32 further comprising decrypting the encryption key identification with a system private key.

34. The method according to claim 26 further comprising checking for expiration of the system key, and upon expiration of the system key, discontinuing use of the system key and generating and using a new system key.

35. The method according to claim 34 further comprising upon expiration of the system key, retaining the system key for decrypting previously encrypted encryption key identifications.

36. The method according to claim 26 further comprising hashing the system key common name to create a system key common name hash value, encrypting the system key common name hash value with the master key, and storing the encrypted system key common name and the encrypted system key common name hash value in association with the data entity.

37. The method according to claim 36 further comprising:
   requesting a data manipulation using a searchable attribute;
   searching for matches to the searchable attribute;
   searching for the system key common name using the system key common name hash value;
   searching for the system key using the system key common name;
   decrypting the encryption key identification with the system key;
   searching for the encryption key using the encryption key identification; and decrypting the data entity with the encryption key.

38. The method according to claim 36 further comprising verifying the system key with a private certificate authority, and performing an integrity check on the system key.

39. The method according to claim 26 further comprising checking the encryption key for expiration.

40. The method according to claim 39 further comprising upon expiration of the encryption key, generating a new encryption key having an expiration date, retrieving data entities using the encryption key, decrypting the retrieved data entities with the encryption key, encrypting the retrieved data entities with the new encryption key, storing the retrieved data entities.

41. The method according to claim 26 further comprising hashing searchable attributes of the data entity to determine data entity attribute hash values and storing the data entity attribute hash values in association with the data entity.

42. The method according to claim 41 further comprising:
   requesting a data manipulation using a searchable attribute;
   hashing the searchable attribute to create a searchable attribute hash value;
   searching for matches to the searchable attribute hash value;
   decrypting the system key common name using the master key;
   searching for the system key using the system key common name;
   decrypting the encryption key identification with the system key;
   searching for the encryption key using the encryption key identification; and
   after retrieving the encryption key, decrypting the data entity with the encryption key.

43. The method according to claim 26 further comprising transmitting the data entity over a data transmission line, and wherein encrypting the data entity comprises encrypting only a portion of the data entity in accordance with a business rule.

44. The method according to claim 26 further comprising generating a new encryption key for each user session.

45. The method according to claim 26 further comprising generating a new encryption key for each user action.

46. The method according to claim 26 further comprising retrieving the encryption key from a separate database, and decrypting the data entity with the encryption key.

47. The method according to claim 26 further comprising auditing the encryption key for a desired event.

48. The method according to claim 26 wherein the data entity and encryption key identification are stored in a first database, and further comprising storing the encryption key in a second database.

49. The method according to claim 26 further comprising encrypting the encryption key identification with a system key having a system key common name, and maintaining the system key within a security domain at all times.

50. The method according to claim 26 further comprising:
   requesting a data manipulation using a searchable attribute;
   searching for matches to the searchable attribute;

decrypting the system key common name using the master key;
searching for the system key using the system key common name;
decrypting the encryption key identification with the system key;
searching for the encryption key using the encryption key identification;
performing an integrity check on the encryption key; and
decrypting the data entity with the encryption key.

51. A method for storage and retrieval of encrypted data, the method comprising:
encrypting a plurality of data entities with a rotating and dynamic encryption key having an encryption key identification;
storing the encrypted data entities;
encrypting the encryption key identification with a system key having a system key identification;
encrypting the system key identification with a master key; and
storing the encrypted encryption key identification and the encrypted system key identification with the encrypted data entity; and
creating and rotating to a new encryption key upon occurrence of a desired rotation event.

52. A method of providing a secure environment for the storage of information, the method comprising:
encrypting a data entity with an encryption key having a randomly generated encryption key identification;
storing the encrypted data entity;
encrypting the encryption key identification with a system key having a system key identification;
encrypting the system key identification with a master key; and
storing the encrypted encryption key identification and the encrypted system key identification in association with the encrypted data entity.

53. A method of encrypting and storing a data entity, the method comprising the steps of:
encrypting a data entity using a first encryption key having a first encryption key identification;
encrypting the first encryption key identification using a second encryption key having a second encryption key identification;
encrypting the second encryption key identification using a third encryption key;
storing the encrypted data entity, the encrypted first encryption key identification, and the encrypted second encryption key identification together;
encrypting the first encryption key using a fourth encryption key having a fourth encryption key identification;
encrypting the fourth encryption key identification using the third encryption key;
encrypting the second and fourth encryption keys using the third encryption key;
storing the unencrypted first encryption key identification, the encrypted fourth encryption key identification, and the encrypted first encryption key together;
storing the unencrypted second encryption key identification and the encrypted second encryption key together;
storing the unencrypted fourth encryption key identification and the encrypted fourth encryption key together; and
securing the third encryption key.

54. The method as set forth in claim 53, wherein the second encryption key identification is a system key common name.

55. The method as set forth in claim 53, wherein the second encryption key identification is a system key common name hash value.

56. A method of encrypting, storing, and decrypting a data entity, the method comprising the steps of:
encrypting and storing the data entity as follows—
encrypting a data entity using a first encryption key having a first encryption key identification,
encrypting the first encryption key identification using a second encryption key having a second encryption key identification,
encrypting the second encryption key identification using a third encryption key,
storing the encrypted data entity, the encrypted first encryption key identification, and the encrypted second encryption key identification together,
encrypting the first encryption key using a fourth encryption key having a fourth encryption key identification,
encrypting the fourth encryption key identification using the third encryption key,
encrypting the second and fourth encryption keys using the third encryption key,
storing the unencrypted first encryption key identification, the encrypted fourth encryption key identification, and the encrypted first encryption key together,
storing the unencrypted second encryption key identification and the encrypted second encryption key together,
storing the unencrypted fourth encryption key identification and the encrypted fourth encryption key together,
securing the third encryption key; and
decrypting the data entity as follows—
accessing the third encryption key and using the third encryption key to decrypt the second encryption key identification and the fourth encryption key identification,
identifying the second encryption key using the decrypted second encryption key identification,
using the second encryption key to decrypt the first encryption key identification,
identifying the first encryption key using the decrypted first encryption key identification,
identifying the fourth encryption key using the decrypted fourth encryption key identification,
using the fourth key to decrypt the first encryption key, and
using the decrypted first encryption key to decrypt the data entity.

57. The method as set forth in claim 56, wherein the second encryption key identification is a system key common name.

58. The method as set forth in claim 56, wherein the second encryption key identification is a system key common name hash value.

* * * * *

UNITED STATES PATENT AND TRADEMARK OFFICE
CERTIFICATE OF CORRECTION

| | |
|---|---|
| PATENT NO. | : 7,362,868 B2 |
| APPLICATION NO. | : 09/693605 |
| DATED | : April 22, 2008 |
| INVENTOR(S) | : Ashraf Madoukh et al. |

It is certified that error appears in the above-identified patent and that said Letters Patent is hereby corrected as shown below:

Column 20, at the beginning of line 55 insert --at least one data entity encrypted by--.

Column 20, line 58, delete [and].

Signed and Sealed this

Eighth Day of July, 2008

JON W. DUDAS
*Director of the United States Patent and Trademark Office*